United States Patent
Arai et al.

(10) Patent No.: US 9,064,516 B2
(45) Date of Patent: Jun. 23, 2015

(54) DISK DRIVE FLEXURE

(71) Applicant: NHK SPRING CO., LTD., Yokohama-shi, Kanagawa (JP)

(72) Inventors: Hajime Arai, Aiko-gun (JP); Futa Sasaki, Aiko-gun (JP)

(73) Assignee: NHK SPRING CO., LTD., Yokohama-shi, Kanagawa-shi, Kanagawa (JP)

( * ) Notice: Subject to any disclaimer, the term of this patent is extended or adjusted under 35 U.S.C. 154(b) by 0 days.

(21) Appl. No.: 14/539,712

(22) Filed: Nov. 12, 2014

(65) Prior Publication Data
US 2015/0138675 A1 May 21, 2015

(30) Foreign Application Priority Data
Nov. 15, 2013 (JP) ................................. 2013-236682

(51) Int. Cl.
*G11B 5/54* (2006.01)
(52) U.S. Cl.
CPC ....................... *G11B 5/54* (2013.01)
(58) Field of Classification Search
CPC ................................. G11B 5/54; G11B 21/08
USPC .......... 360/264.2, 264.3, 264.4, 264.8, 265.9, 360/245.9, 265.1, 265.7, 265.8
See application file for complete search history.

(56) References Cited

U.S. PATENT DOCUMENTS

| | | | |
|---|---|---|---|
| 7,872,834 B1 * | 1/2011 | Pokornowski et al. | .... 360/294.4 |
| 8,325,446 B1 | 12/2012 | Liu et al. | |
| 2010/0165516 A1 * | 7/2010 | Fuchino | ..................... 360/294.4 |
| 2014/0022674 A1 * | 1/2014 | Takikawa et al. | .......... 360/244.5 |

* cited by examiner

*Primary Examiner* — Allen T Cao
(74) *Attorney, Agent, or Firm* — Holtz, Holtz, Goodman & Chick PC

(57) ABSTRACT

A flexure tail is provided in a flexure including a metal base and a conductive circuit portion. The flexure tail includes a tail pad portion. In the tail pad portion, tail electrodes to are arranged. At the tail pad portion, a stub which remains after a test pad portion is cut off is formed. The stub includes conductors to which are left uncut. The conductors to which are left uncut are electrically connected to the tail electrodes to, respectively. The stub includes a bent portion. The bent portion is formed by bending a frame portion of the tail pad portion, and forms an angle of 30° or more with respect to a circuit board. The tail electrodes to are joined to terminals to of the circuit board.

6 Claims, 12 Drawing Sheets

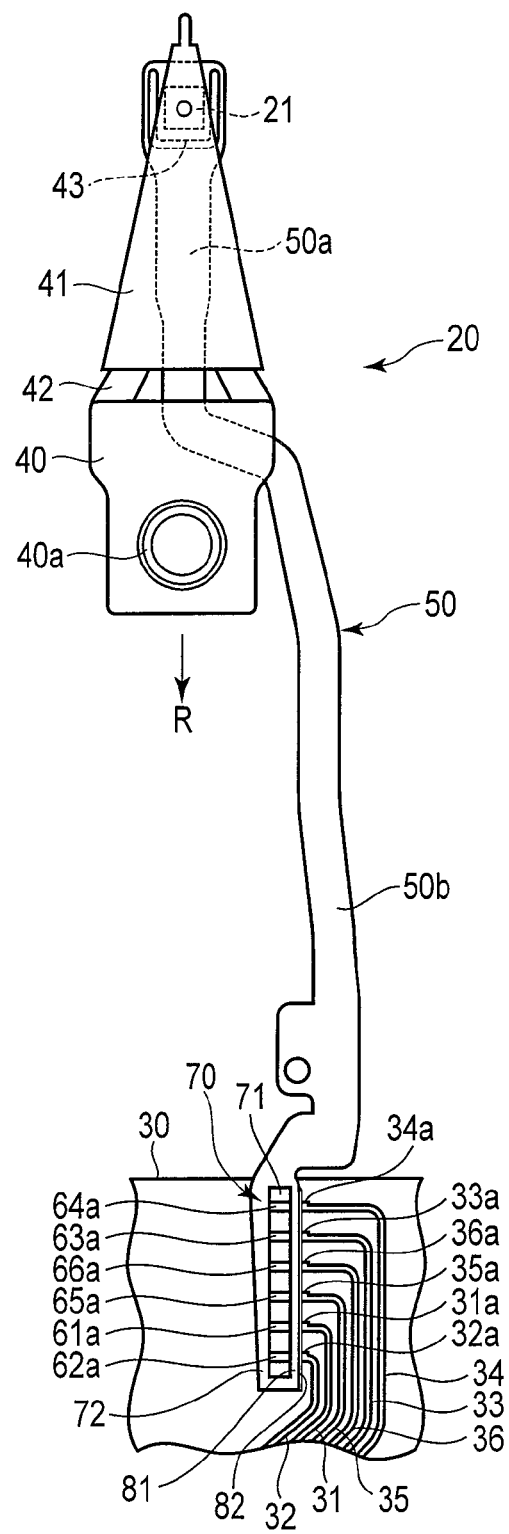
F I G. 3

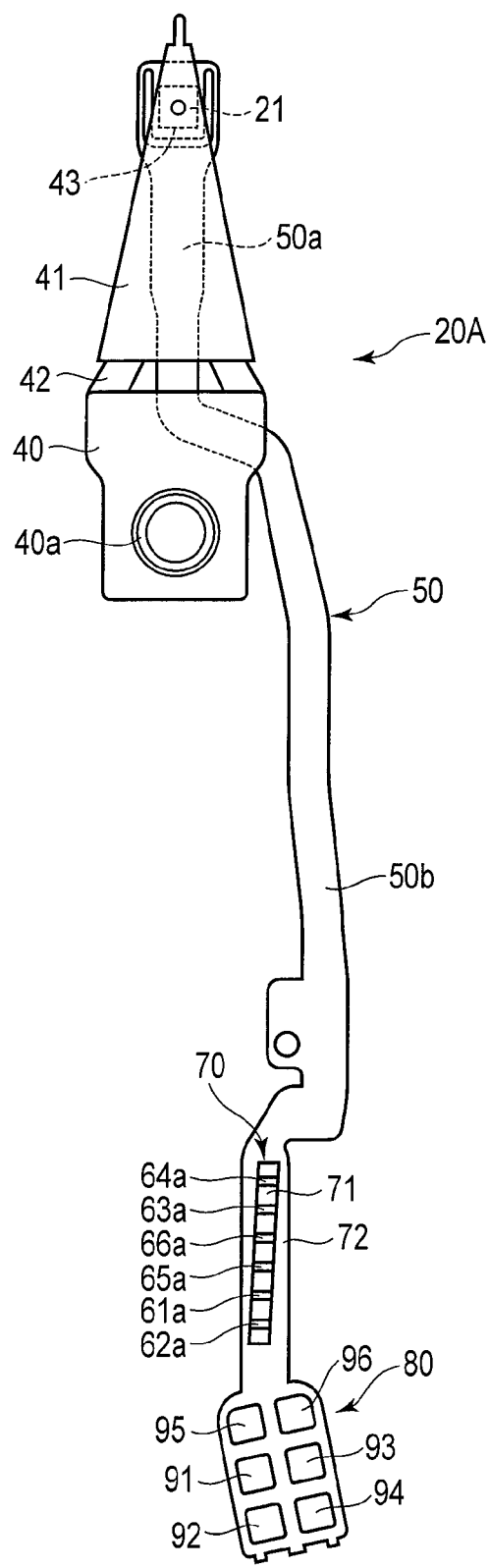
F I G. 8

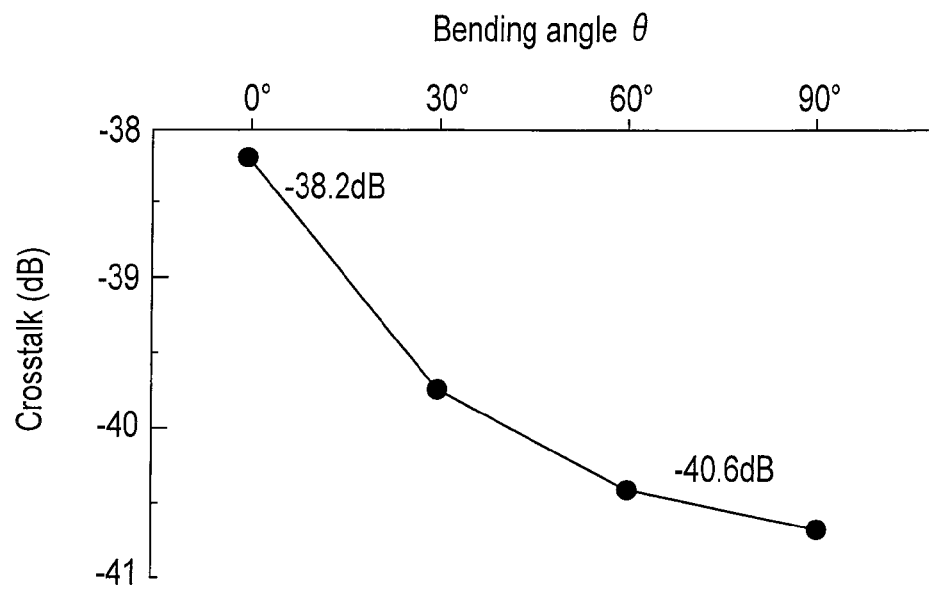
F I G. 13
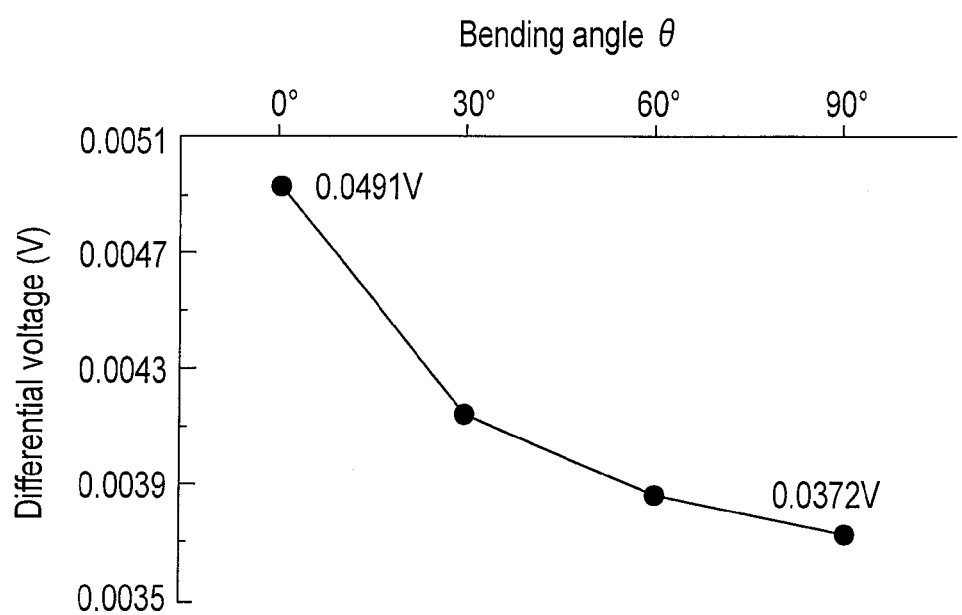
F I G. 14

DISK DRIVE FLEXURE

CROSS-REFERENCE TO RELATED APPLICATIONS

This application is based upon and claims the benefit of priority from prior Japanese Patent Application No. 2013-236682, filed Nov. 15, 2013, the entire contents of which are incorporated herein by reference.

BACKGROUND OF THE INVENTION

1. Field of the Invention

This invention relates to a disk drive flexure used for a head gimbal assembly of a disk drive.

2. Description of the Related Art

A hard disk drive (HDD) is used in an information processor such as a personal computer. The HDD comprises a magnetic disk rotatable about a spindle, a carriage turnable about a pivot, etc. On an arm of the carriage, a disk drive suspension (which will be hereinafter simply referred to as a suspension) is provided.

The suspension comprises a load beam, and a flexure disposed to overlap the load beam. A magnetic head including a slider is mounted on a gimbal portion formed near a distal end of the flexure. The magnetic head is provided with elements for accessing data, that is, for reading or writing data. The suspension, the flexure, etc., constitute a head gimbal assembly.

Various types of flexures have been put to practical use according to the required specification. As an example of the flexure, a flexure with conductors is known. The flexure with conductors includes a metal base made of a thin stainless steel plate, an insulating layer made of an electrically insulating material, such as polyimide, which is formed on the metal base, and a plurality of conductors formed on the insulating layer. The flexure includes a portion which overlaps the load beam, and a flexure tail which extends toward the back of a baseplate.

Part of the conductors is for writing, and the other part of the same is for reading. Ends of these conductors are connected to elements (for example, MR elements) provided in the magnetic head. The other ends of the conductors are connected to tail electrodes formed in the flexure tail. These tail electrodes are electrically connected to terminals of a circuit board such as a flexible printed circuit board (FPC). On the circuit board, a signal processing circuit such as a preamplifier is mounted.

A flexure tail disclosed in U.S. Pat. No. 8,325,446 comprises a tail pad portion comprising tail electrodes, and a test pad portion comprising test electrodes. The test pad portion is used for inspecting electrical characteristics of a magnetic head, and is cut off from a flexure tail after inspection has been carried out.

In the flexure tail having the test pad portion, when the test pad portion is cut off, a portion referred to as a stub which is left uncut is formed near the tail pad portion. A plurality of conductors which are left uncut are arranged in the stub. These conductors extend toward a cut surface of the stub from the tail electrodes, respectively. The tail electrodes are laid over terminals of a circuit board, and the tail electrodes and the terminals are electrically connected by bonding means such as ultrasonic bonding.

The conductors are covered by an electrically insulating cover layer. The conductors of the stub and conductors of the circuit board are electrically insulated from each other. Accordingly, even if the stub is laid over the conductors of the circuit board, it has been considered that this causes no problem in particular electrically. However, from the intensive study of the inventors of the present invention, it has been found that in a flexure tail having the stub as described above, a leakage current called crosstalk flows through read conductors when a pulse signal is passed to write conductors. The crosstalk becomes a cause of electrical characteristics of the disk drive to be adversely affected.

BRIEF SUMMARY OF THE INVENTION

Accordingly, an object of the present invention is to provide a disk drive flexure which can reduce occurrence of crosstalk while having a stub disposed over terminals of a circuit board.

According to an exemplary embodiment, a flexure which is secured to a load beam of a disk drive suspension and on which a magnetic head is mounted comprises a metal base, a conductive circuit portion formed on the metal base, and a flexure tail. The flexure tail comprises a tail pad portion in which tail electrodes are formed, a stub including a cut surface formed on one end of the tail pad portion and comprising conductors which are electrically connected to the tail electrodes, and a bent portion formed by bending the stub in a thickness direction.

According to the structure of this embodiment, in the disk drive flexure comprising the flexure tail provided with the stub disposed over conductors of a circuit board such as an FPC, crosstalk which occurs in read conductors can be restrained, and electronic characteristics of the disk drive can be improved.

According to the embodiment, a frame portion which is a part of the metal base is formed on the tail pad portion, and the bent portion is formed by bending the frame portion in a thickness direction. That is, the tail pad portion comprises the frame portion which is formed of a part of the metal base, and the bent portion is provided at the frame portion. It is preferable to set a bending angle of the bent portion to be greater than or equal to 30° and less than or equal to 90°. Also, the tail electrodes should preferably be joined to terminals of the circuit board such as the FPC on which a preamplifier is mounted, and an angle formed by the circuit board and the bent portion be 30° or more.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 3 is a partial plan view of the suspension having a flexure tail and a circuit board according to one embodiment;

FIG. 8 is a plan view of the suspension having the flexure tail including a test pad portion;

FIG. 13 is a graph showing the relationship between the bending angle corresponding to each of four types of waveforms shown in FIG. 12 and a decibel value of crosstalk;

FIG. 14 is a graph showing the relationship between the bending angle corresponding to each of the four types of waveforms shown in FIG. 12 and a differential voltage of the crosstalk;

DETAILED DESCRIPTION OF THE INVENTION

A disk drive flexure according to one embodiment will be hereinafter described with reference to FIGS. 1 to 17.

Figure 1:
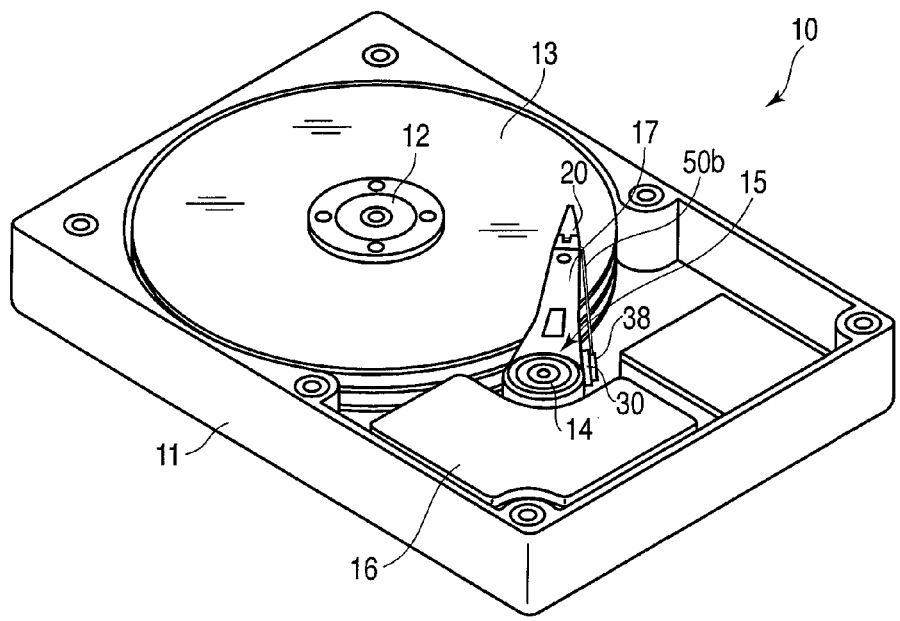
FIG. 1 is a perspective view showing an example of a disk drive comprising a suspension.

A hard disk drive (HDD) 10 shown in FIG. 1 comprises a case 11, disks 13 rotatable about a spindle 12, a carriage 15 turnable about a pivot 14, a positioning motor 16 for actuating the carriage 15, etc. The case 11 is sealed by a lid (not shown).

Figure 2:
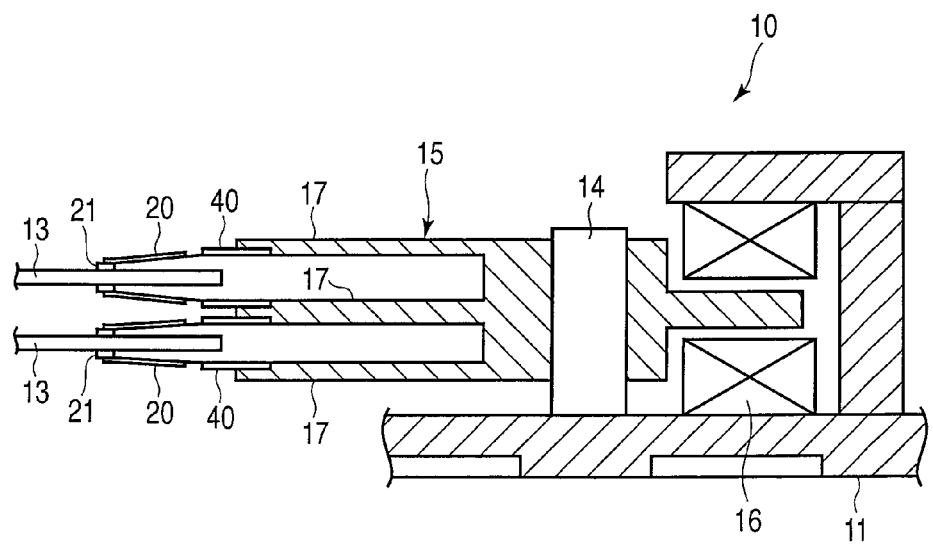
FIG. 2 is a partial cross-sectional view of the disk drive shown in FIG. 1.

FIG. 2 is a cross-sectional view schematically showing a part of the disk drive 10. The carriage 15 is provided with arms 17. At a distal end portion of each arm 17, a disk drive suspension (hereinafter simply referred to as a suspension) 20 is mounted. At a distal end of the suspension 20, a slider 21 which serves as a magnetic head is provided. When each disk 13 rotates at high speed, an air bearing is formed between the disk 13 and the slider 21.

If the carriage 15 is turned by the positioning motor 16, the suspension 20 moves radially relative to the disk 13, and the slider 21 thereby moves to a desired track of the disk 13. The slider 21 is provided with a magnetic coil for recording data on the disk 13, magnetoresistive (MR) elements for reading data recorded on the disk 13, a heater, etc. The MR elements serve as reading means for performing conversion between magnetic and electrical signals.

FIG. 3 shows the suspension 20 according to one embodiment of the present invention, and a part of a circuit board 30. An example of the circuit board 30 is a flexible printed circuit board (FPC). On the circuit board 30, write conductors 31 and 32, read conductors 33 and 34, a heater conductor 35, and a ground conductor 36 are provided. Terminals 31*a* to 36*a* of these conductors 31 to 36 are exposed on a surface of the circuit board 30.

On the circuit board 30, a preamplifier 38 (FIG. 1) which constitutes a part of a signal processing circuit is mounted. The preamplifier 38 is connected to the write conductors 31 and 32, and the read conductors 33 and 34. A write current which is output from the preamplifier 38 is supplied to the magnetic coil of the slider 21 via the write conductors 31 and 32. An electrical signal output from the MR elements provided in the slider 21 is input to the preamplifier 38 via the read conductors 33 and 34. The current flowing in the write conductors 31 and 32 is greater than that flowing in the read conductors 33 and 34.

The suspension 20 comprises a baseplate 40, a load beam 41, a hinge member 42, and a flexure 50 with conductors. The flexure 50 with conductors may be simply referred to as the flexure 50. A boss portion 40*a* of the baseplate 40 is secured to the arm 17 (FIGS. 1 and 2) of the carriage 15. A tongue 43 (FIG. 3) is formed near a distal end of the flexure 50. The slider 21 is mounted on the tongue 43.

As shown in FIG. 3, the flexure 50 includes a first portion 50*a* extending along the load beam 41, and a second portion, i.e., a flexure tail 50*b* extending toward the back of the baseplate 40 from the first portion 50*a*. The back of the baseplate 40 mentioned here is the direction indicated by arrow R in FIG. 3, that is, the direction of coming near the circuit board 30. The first portion 50*a* of the flexure 50 is secured to the load beam 41 by fixation means such as laser welding.

Figure 4:
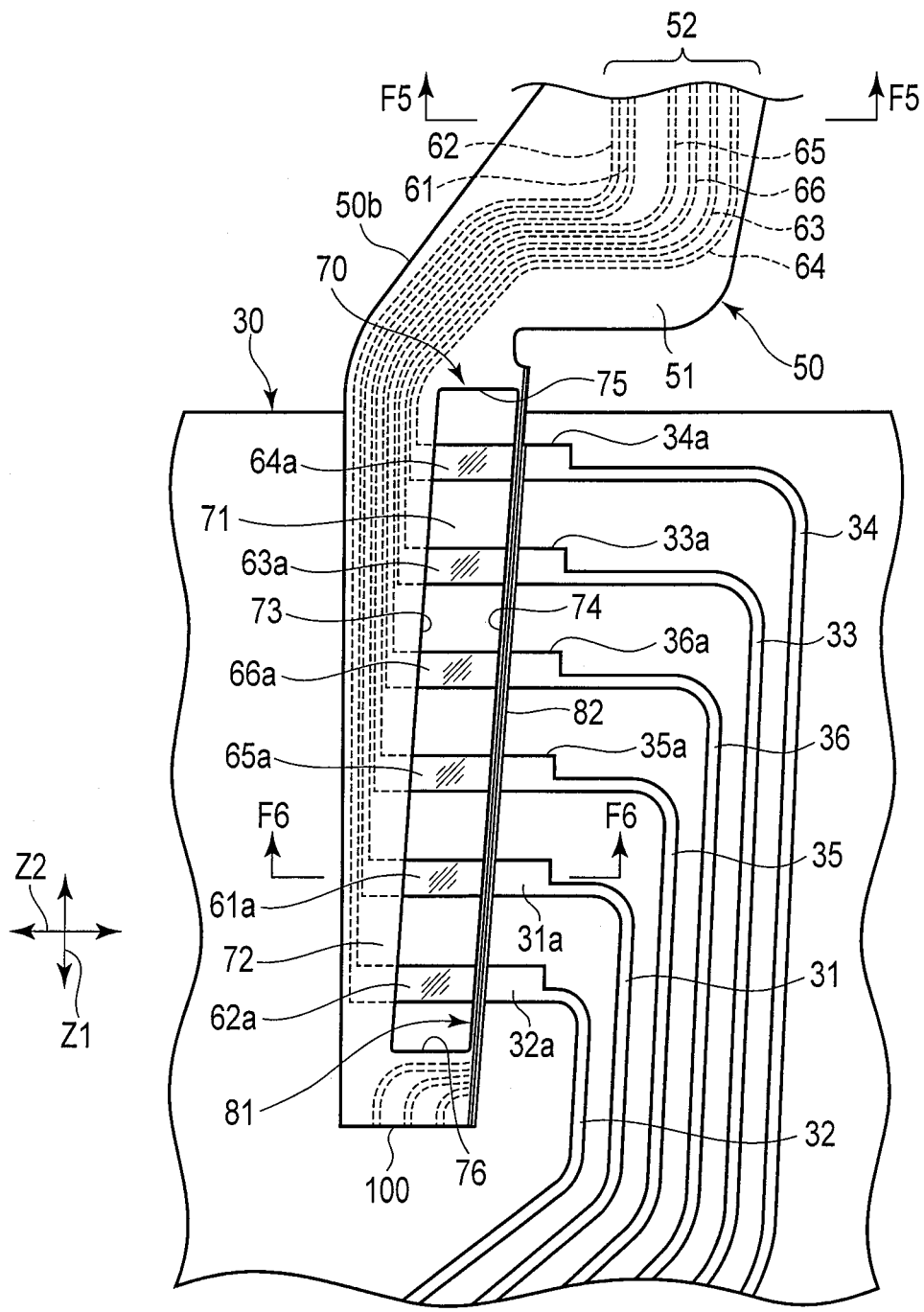
FIG. 4 is an enlarged plan view of a part of the flexure tail of the suspension and the circuit board shown in FIG. 3.
Figure 5:
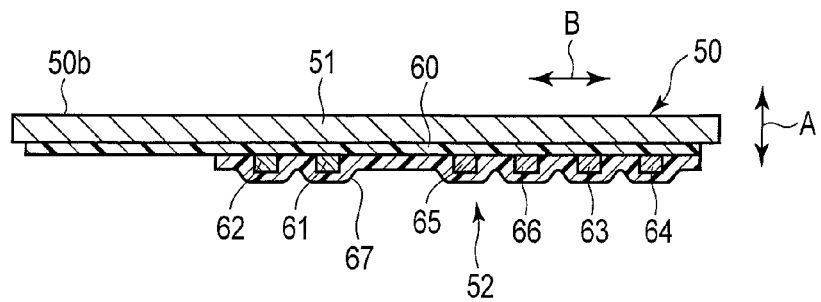
FIG. 5 is a cross-sectional view of the flexure tail taken along line F5-F5 of FIG. 4.
Figure 6:
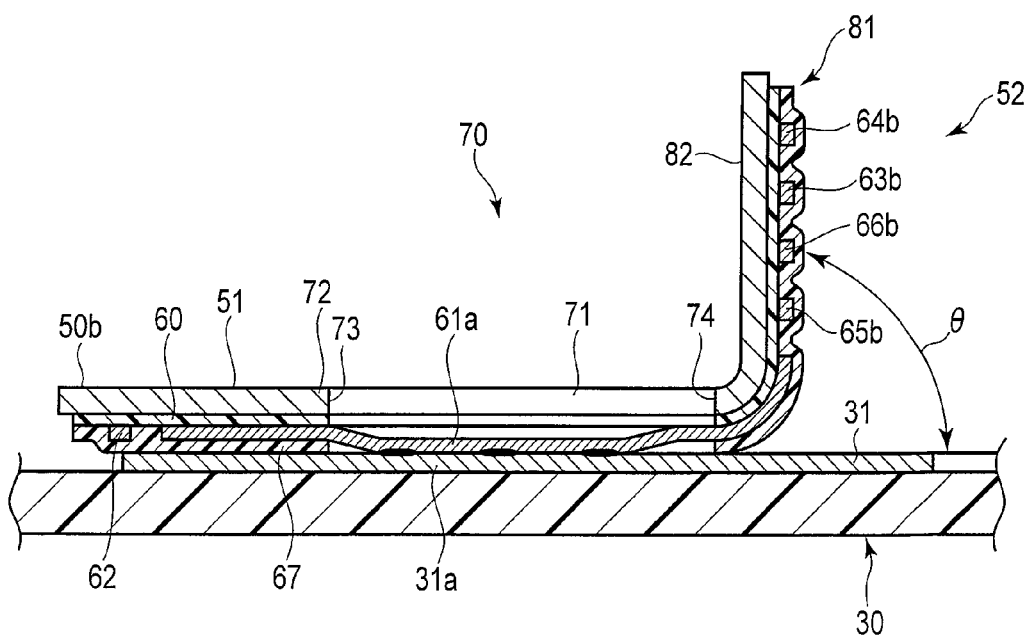
FIG. 6 is a partial cross-sectional view of the flexure tail and the circuit board taken along line F6-F6 of FIG. 4.

FIG. 4 is a plan view showing a part of the circuit board 30 and the flexure tail 50*b* in an enlarged scale. FIG. 5 is a schematic cross-sectional view of the flexure tail 50*b* taken along line F5-F5 of FIG. 4. FIG. 6 is a schematic cross-sectional view of the circuit board 30 and the flexure tail 50*b* taken along line F6-F6 of FIG. 4.

The flexure 50 includes a metal base 51 made of a plate of austenitic stainless steel, for example, and a conductive circuit portion 52 formed along the metal base 51. The metal base 51 can be subjected to plastic working such as bending, and the metal base 51 also has springiness. A thickness of the metal base 51 is smaller than a thickness of the load beam 41. A thickness of the load beam 41 is, for example, 30 to 62 µm, and a thickness of the metal base 51 is, for example, 18 µm (12 to 25 µm).

The conductive circuit portion 52 includes an insulating layer 60 formed on the metal base 51, write conductors 61 and 62, read conductors 63 and 64, a heater conductor 65, and a ground conductor 66 which are formed on the insulating layer 60, and a cover layer 67 covering these conductors 61 to 66. The insulating layer 60 and the cover layer 67 are formed of an electrically insulating material such as polyimide. In FIG. 5, double-headed arrow A indicates a thickness direction of the flexure 50, and double-headed arrow B indicates a lateral direction of the flexure 50.

The conductors 61 to 66 of the flexure 50 are made of, for example, plating copper (pure copper), and formed to have a predetermined pattern along the insulating layer 60 by etching. A thickness of the insulating layer 60 is, for example, 10 µm (5 to 20 µm). A thickness of each of the conductors 61 to 66 is, for example, 10 µm (4 to 15 µm). A thickness of the cover layer 67 is, for example, 5 µm (2 to 10 µm).

As shown in FIGS. 3 and 4, a tail pad portion 70 is formed in the flexure tail 50*b*. In the tail pad portion 70, write tail electrodes 61*a* and 62*a*, read tail electrodes 63*a* and 64*a*, a heater electrode 65*a*, and a ground tail electrode 66*a* are arranged.

Figure 7:
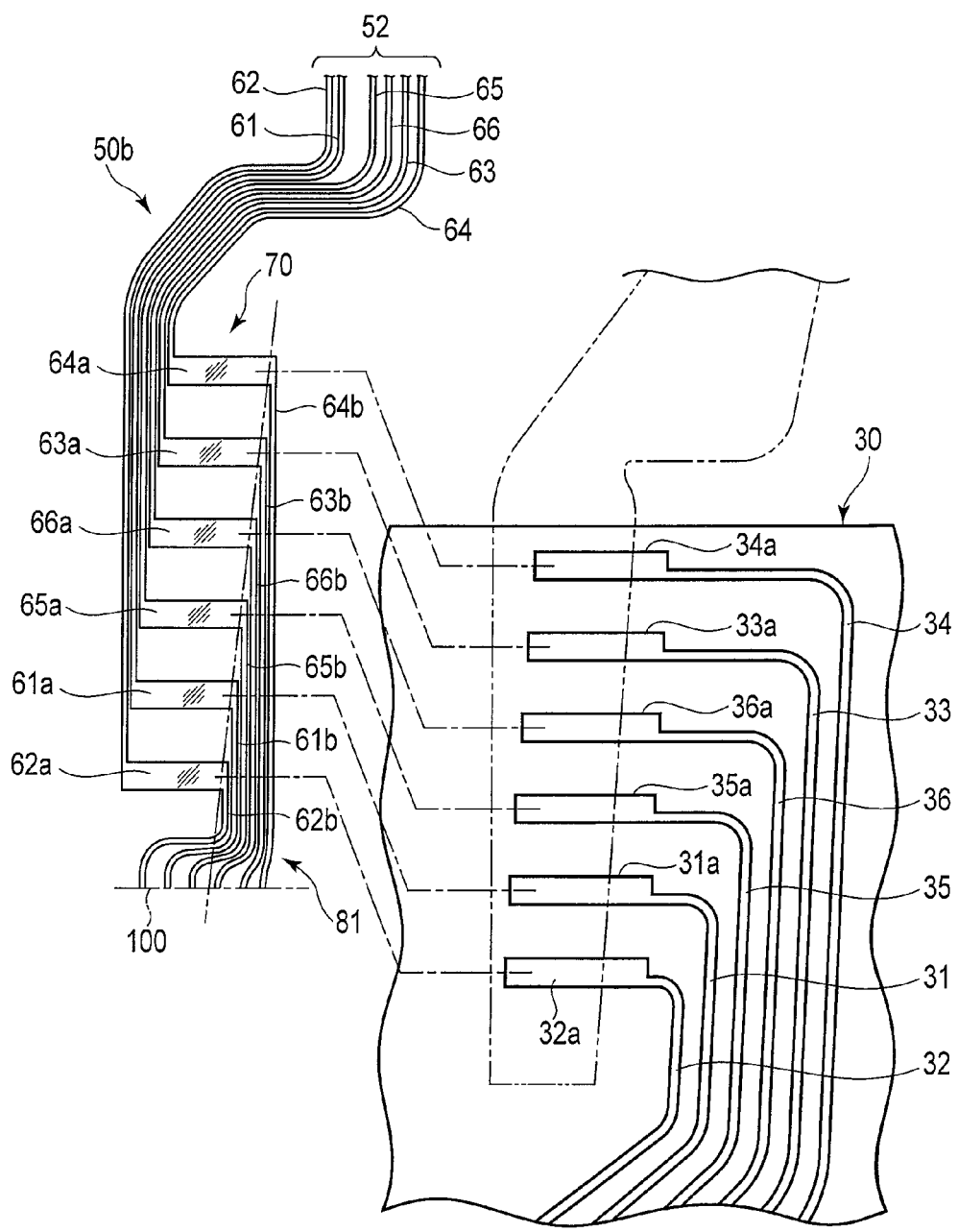
FIG. 7 is a plan view of tail electrodes of the flexure tail and conductors of the circuit board shown in FIG. 4.

FIG. 7 shows the state before the tail electrodes 61*a* to 66*a* are joined to the terminals 31*a* to 36*a* of the circuit board 30. The conductors 31 to 36 of the circuit board 30 are electrically connected to the terminals 31*a* to 36*a*. The write tail electrodes 61a and 62a are electrically connected to the write conductors 61 and 62. The read tail electrodes 63a and 64a are electrically connected to the read conductors 63 and 64. The heater tail electrode 65a is electrically connected to the heater conductor 65. The ground tail electrode 66a is electrically connected to the ground conductor 66. These conductors 61 to 66 are formed such that they become substantially parallel to each other in the tail pad portion 70. The tail electrodes 61a to 66a are laid over the terminals 31a to 36a of the circuit board 30, and the tail electrodes 61a to 66a are joined to the terminals 31a to 36a by bonding means such as ultrasonic bonding.

As shown in FIGS. 3, 4, and 6, a frame portion 72 having an opening 71 is formed on a part of the metal base 51 of the tail pad portion 70. The opening 71 extends in a longitudinal direction of the flexure tail 50b (indicated by double-headed arrow Z1 in FIG. 4). The opening 71 of the metal base 51 is formed by etching. A similar opening 71 is formed in the insulating layer 60 and the cover layer 67. Each of the tail electrodes 61a to 66a traverses the opening 71, and is exposed at the interior of the opening 71.

The opening 71 comprises longitudinal frames 73 and 74 extending in the longitudinal direction of the flexure tail 50b (indicated by double-headed arrow Z1 in FIG. 4), and lateral frames 75 and 76 extending in a lateral direction of the flexure tail 50b (indicated by double-headed arrow Z2). That is, the frame portion 72 is constituted of the longitudinal frames 73 and 74, and the lateral frames 75 and 76. The longitudinal frames 73 and 74 and the lateral frames 75 and 76 are all part of the metal base 51.

The flexure tail 50b shown in FIGS. 3 to 7 comprises a stub 81 which remains after a test pad portion 80 (shown in FIGS. 8 and 9) is cut off. A bent portion 82 is formed by bending the stub 81 as shown in FIG. 6. The bent portion 82 is bent in a direction of separating from the circuit board 30 such that an angle (bending angle) θ formed with respect to the circuit board 30 becomes 90°, for example.

Figure 9:
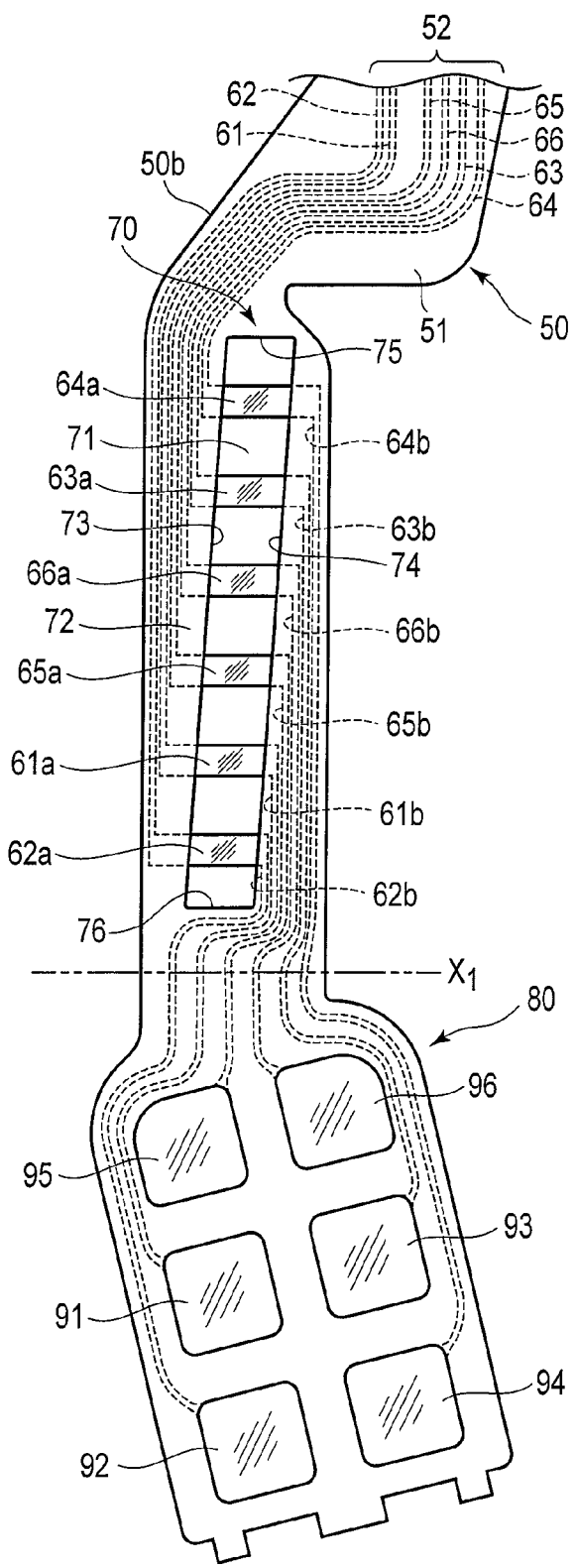
FIG. 9 is a plan view showing a part of the flexure tail shown in FIG. 8 in an enlarged scale.

The flexure tail 50b of a suspension 20A shown in FIG. 8 comprises the test pad portion 80. FIG. 9 is a plan view of the tail pad portion 70 and the test pad portion 80 in an enlarged scale. Test electrodes 91 to 96 are provided in the test pad portion 80. The test electrodes 91 to 96 and the tail electrodes 61a to 66a are electrically connected to each other via conductors 61b to 66b, respectively.

Figure 10:
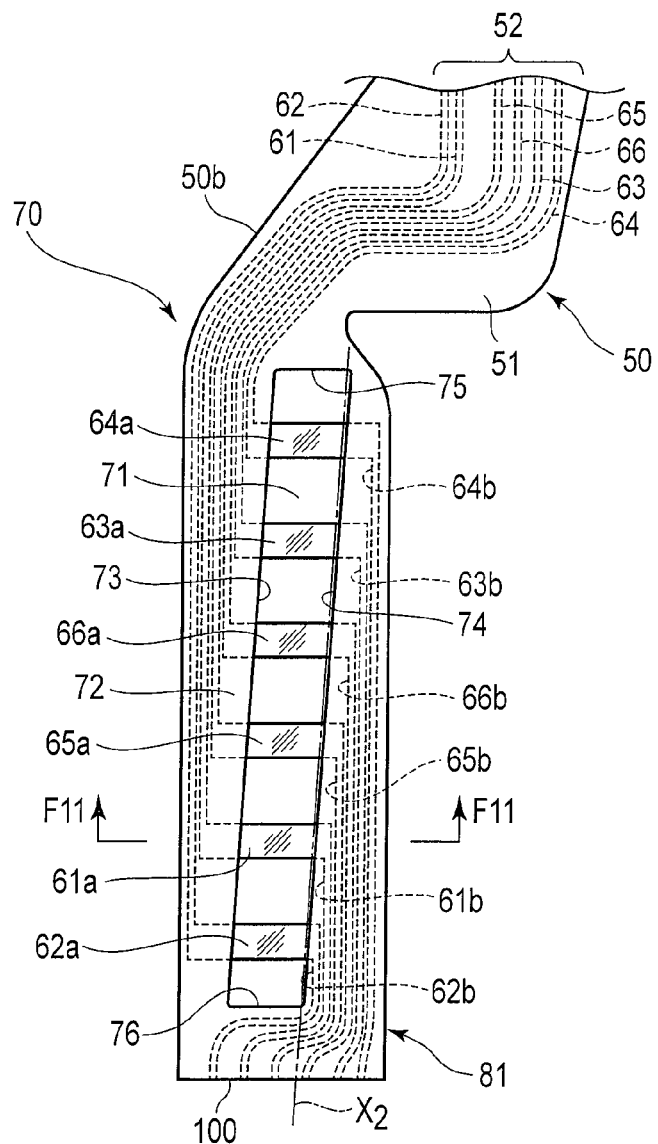
FIG. 10 is a plan view of a state in which the test pad portion is cut off from the flexure tail shown in FIG. 9.
Figure 11:
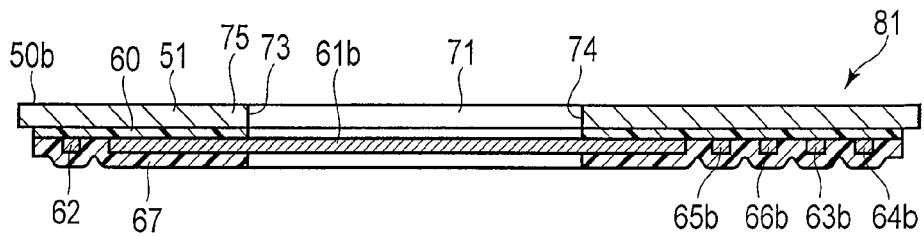
FIG. 11 is a cross-sectional view of the flexure tail taken along line F11-F11 of FIG. 10.

Electrical characteristics, etc., of the magnetic head (the slider 21) are inspected by using the test electrodes 91 to 96. After inspection has been carried out, the test pad portion 80 is cut off from the flexure tail 50b. The test pad portion 80 is cut off from the flexure tail 50b at a portion indicated by two-dot chain line X1 of FIG. 9, for example. When the test pad portion 80 is cut off, the stub 81 remains in one of side portions of the tail pad portion 70, as shown in FIG. 10. At one end of the test pad portion 80, a cut surface 100 produced when the test pad portion 80 is cut off is formed. The stub 81 includes the cut surface 100. FIG. 11 is a cross-sectional view taken along line F11-F11 of FIG. 10.

As shown in FIGS. 10 and 11, the stub 81 includes the conductors 61b to 66b which are left uncut. The conductors 61b to 66b which are left uncut extend substantially parallel to each other toward the cut surface 100 from the tail electrodes 61a to 66a. By bending the stub 81 in a thickness direction at folding line X2 shown by a one-dot chain line in FIG. 10, the bent portion 82 (FIGS. 3, 4, and 6) is formed. As shown in FIG. 10, folding line X2 passes corners of the lateral frames 75 and 76 of the frame portion 72, i.e., crossing the side of the opening 71 along the longitudinal frame 74 of the two longitudinal frames.

The lateral frames 75 and 76 are part of the metal base 51 for which plastic working can be performed. By performing the bending at each of the lateral frames 75 and 76 thickness direction, the bent portion 82 is formed. In other words, in order to form the bent portion 82, of the stub 81, the bending needs to be performed at only the lateral frames 75 and 76 of the frame portion 72. Accordingly, the bent portion 82 can be formed easily, and the bending angle θ (FIG. 6) can be maintained by stiffness of the metal base 51 of the frame portion 72.

Figure 12:
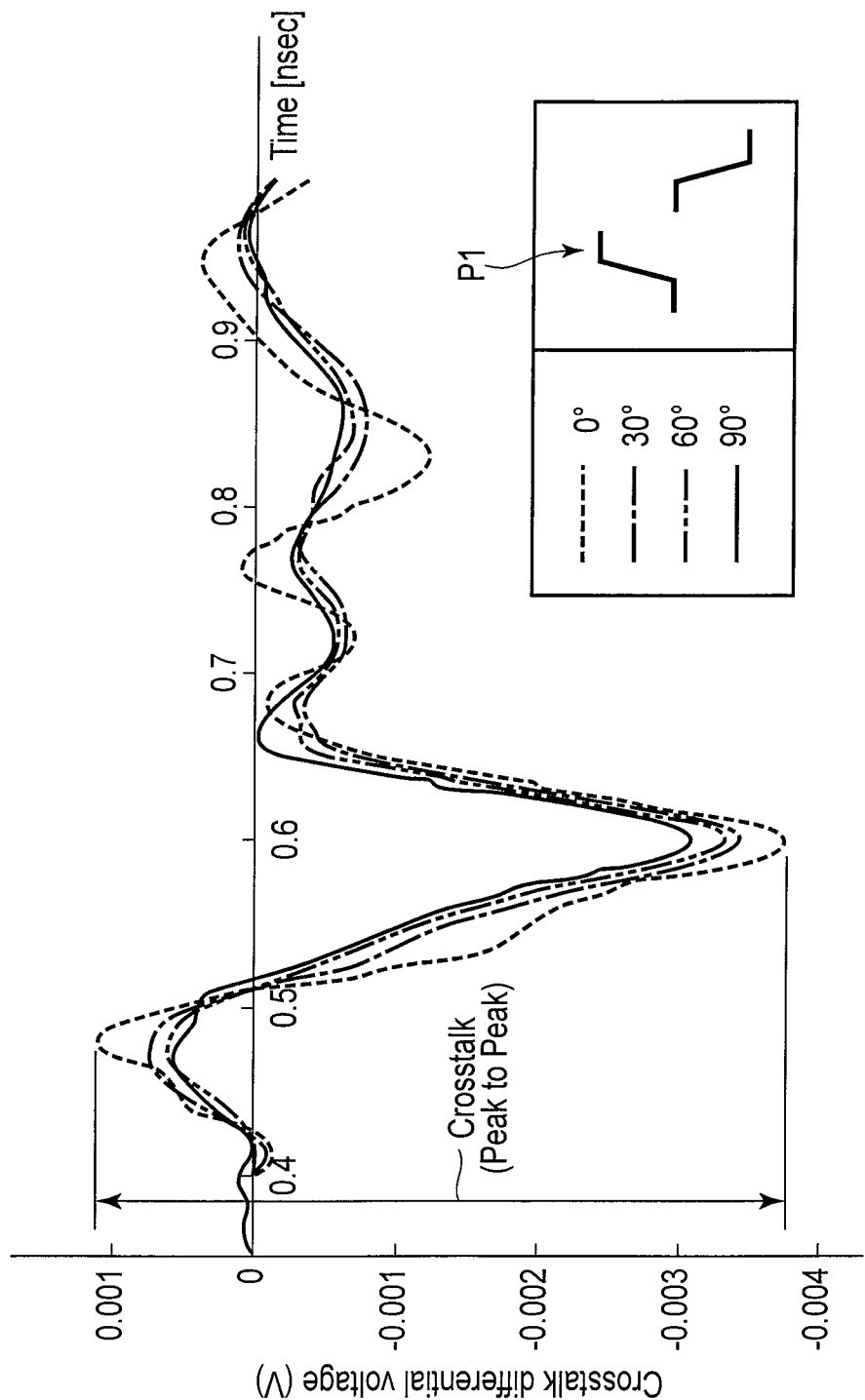
FIG. 12 is a graph showing a crosstalk waveform generated by a square-wave pulse for each of four types of bending angles.

FIG. 12 is a graph showing a crosstalk waveform generated by square-wave pulse (step pulse) P1 for each of four types of bending angles (θ=0°, 30°, 60°, and 90°). In this graph, the magnitude of the crosstalk is represented by the differential voltage between a positive peak and a negative peak.

FIG. 13 shows the relationship between the bending angle (θ=0°, 30°, 60°, and 90°) corresponding to each of four types of waveforms shown in FIG. 12 and a decibel value of the crosstalk. FIG. 14 shows the relationship between the bending angle (θ=0°, 30°, 60°, and 90°) corresponding to each of the four types of waveforms shown in FIG. 12 and a differential voltage of the crosstalk.

As shown in FIGS. 13 and 14, as compared to the case where the bending angle θ is 0°, when the bending angle θ is 30° or more, the crosstalk is significantly reduced. When the bending angle θ is 60° or more, the crosstalk reduction effect is further increased. The crosstalk reduction effect becomes maximum when the bending angle θ is 90°. It is considered that the result as described above was obtained because induced electromotive force generated by a current flowing through the write conductors 61 and 62 causes great crosstalk in the read conductors 63 to 64 as the bending angle θ approximates 0°.

Figure 15:
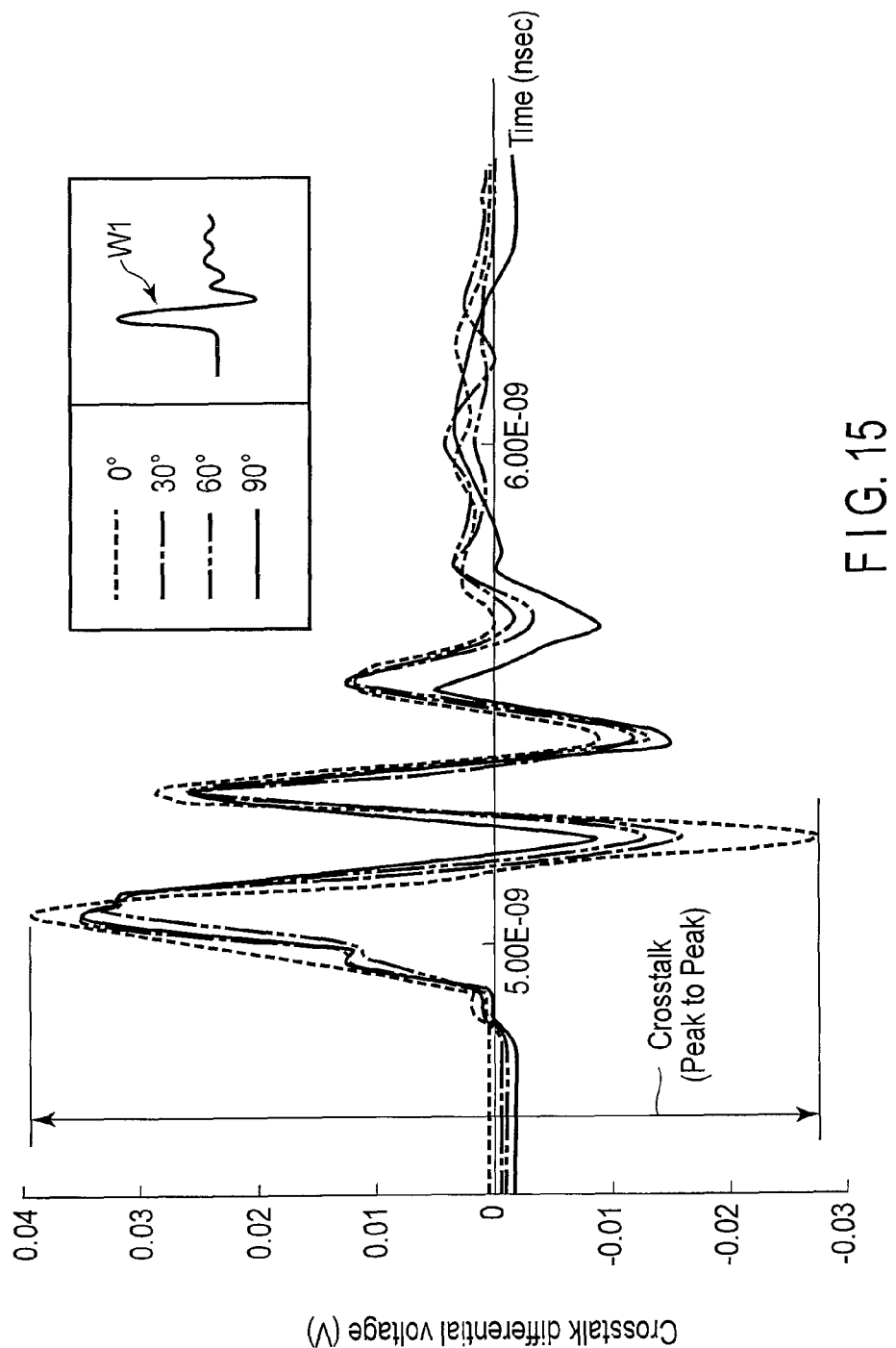
FIG. 15 is a graph showing a crosstalk waveform generated by a waveform pulse for each of the four types of the bending angles.

FIG. 15 is a graph showing a crosstalk waveform generated by waveform pulse W1 of a write current for each of the four types of bending angles (θ=0°, 30°, 60°, and 90°). Waveform pulse W1 is output from the preamplifier mounted on the circuit board (FPC). In FIG. 15, the magnitude of the crosstalk is represented by the differential voltage between a positive peak and a negative peak.

Figure 16:
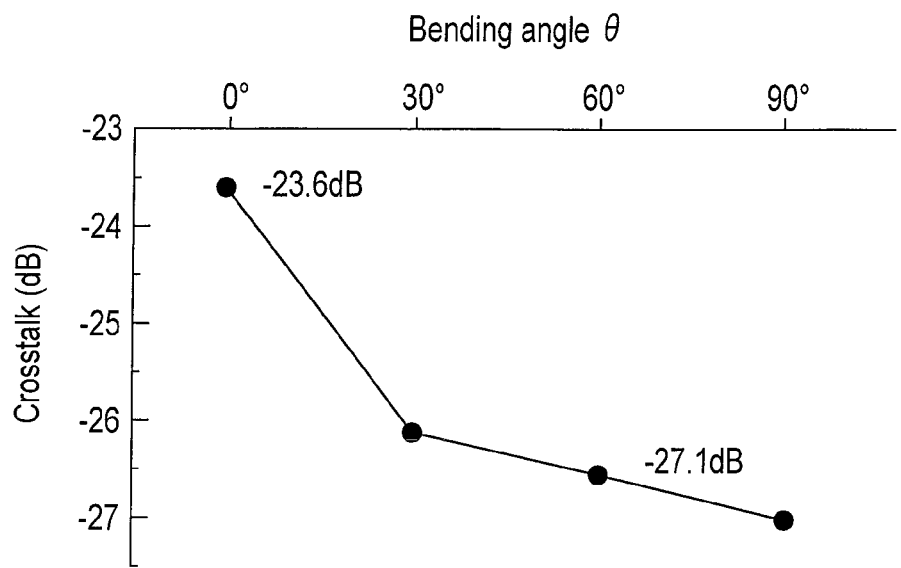
FIG. 16 is a graph showing the relationship between the bending angle corresponding to each of four types of waveforms shown in FIG. 15 and a decibel value of crosstalk.
Figure 17:
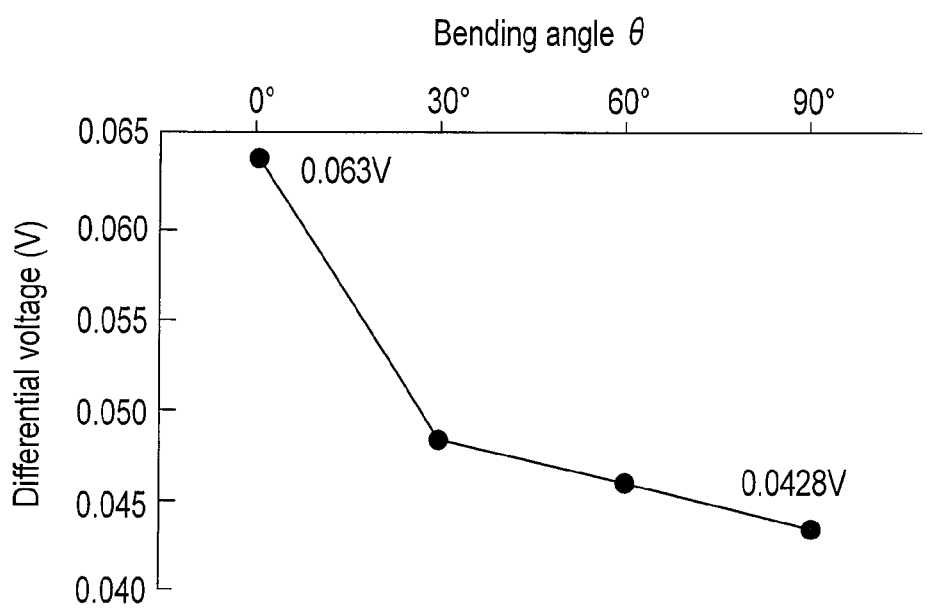
FIG. 17 is a graph showing the relationship between the bending angle corresponding to each of the four types of waveforms shown in FIG. 15 and a differential voltage of the crosstalk.

FIG. 16 shows the relationship between the bending angle (θ=0°, 30°, 60°, and 90°) corresponding to each of four types of waveforms shown in FIG. 15 and a decibel value of the crosstalk. FIG. 17 shows the relationship between the bending angle (θ=0°, 30°, 60°, and 90°) corresponding to each of the four types of waveforms shown in FIG. 15 and a differential voltage of the crosstalk.

As shown in FIGS. 16 and 17, even if a waveform pulse is input, as compared to the case where the bending angle θ is 0°, the crosstalk is significantly reduced when the bending angle θ is 30° or more. The crosstalk reduction effect is further increased when the bending angle θ is 60°, and the crosstalk reduction effect becomes maximum when the bending angle θ is 90°. Even if the bending angle exceeds 90°, the level of the crosstalk reduction effect is the same as that of 90°. However, since bending becomes difficult when the bending angle exceeds 90°, θ should preferably be 90° or less.

As described above, by setting the bending angle θ of the stub 81 to be 30° or more, and more preferably, 60° or more, it is possible to reduce the crosstalk which occurs in the read conductors 63 and 64 to a practically insignificant level, and obtain the flexure 50 having excellent electrical properties.

Needless to say, in carrying out the present invention, as well as the form of the suspension and the flexure, the shape of the metal base and conductors which constitute the conductive circuit portion, the number of conductors, and the specific structures of the tail pad portion, the frame portion, and the test pad portion may be modified variously. Also, the bending angle θ of the stub can be selected as needed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A disk drive flexure which is secured to a load beam of a disk drive suspension and on which a magnetic head is mounted, the flexure comprising:
   a metal base and a conductive circuit portion formed on the metal base; and
   a flexure tail,
   the flexure tail comprising:
   a tail pad portion in which tail electrodes are formed;
   a stub including a cut surface formed on one end of the tail pad portion and comprising conductors which are electrically connected to the tail electrodes; and
   a bent portion formed in the stub in a thickness direction.

2. The disk drive flexure of claim 1, wherein the tail pad portion comprises a frame portion formed by a part of the metal base, and the bent portion is provided at the frame portion.

3. The disk drive flexure of claim 1, wherein a bending angle of the bent portion is between 30° and 90°.

4. The disk drive flexure of claim 2, wherein a bending angle of the bent portion is between 30° and 90°.

5. The disk drive flexure of claim 1, wherein the tail electrodes are joined to terminals of a circuit board on which a preamplifier is mounted, and an angle formed by the circuit board and the bent portion is between 30° and 90°.

6. The disk drive flexure of claim 2, wherein the tail electrodes are joined to terminals of a circuit board on which a preamplifier is mounted, and an angle formed by the circuit board and the bent portion is between 30° and 90°.

* * * * *